(12) United States Patent
Do

(10) Patent No.: US 7,605,887 B2
(45) Date of Patent: Oct. 20, 2009

(54) METHOD OF FABRICATING IN-PLANE SWITCHING MODE LIQUID CRYSTAL DISPLAY DEVICE

(75) Inventor: Myung-Ho Do, Gyoungsunghuk-Do (KR)

(73) Assignee: LG Display Co., Ltd., Seoul (KR)

(*) Notice: Subject to any disclaimer, the term of this patent is extended or adjusted under 35 U.S.C. 154(b) by 337 days.

(21) Appl. No.: 11/095,483

(22) Filed: Apr. 1, 2005

(65) Prior Publication Data

US 2005/0168677 A1     Aug. 4, 2005

Related U.S. Application Data

(63) Continuation of application No. 10/453,568, filed on Jun. 4, 2003, now Pat. No. 6,900,862.

(30) Foreign Application Priority Data

Dec. 11, 2002  (KR) .............................. 2002-78870

(51) Int. Cl.
G02F 1/1333 (2006.01)
(52) U.S. Cl. ..................................... 349/110
(58) Field of Classification Search ................ 349/110, 349/111
See application file for complete search history.

(56) References Cited

U.S. PATENT DOCUMENTS

| | | | |
|---|---|---|---|
| 5,598,285 A | 1/1997 | Kondo et al. | |
| 5,745,207 A | 4/1998 | Asada et al. | |
| 5,781,261 A * | 7/1998 | Ohta et al. | 349/111 |
| 5,805,247 A | 9/1998 | Oh-E et al. | |
| 5,831,701 A | 11/1998 | Matsuyama et al. | |
| 5,838,037 A | 11/1998 | Masutani et al. | |
| 5,946,060 A | 8/1999 | Nishiki et al. | |
| 5,990,987 A | 11/1999 | Tanaka et al. | |
| 6,028,653 A | 2/2000 | Nishida | |
| 6,040,887 A | 3/2000 | Matsuyama et al. | |
| 6,097,454 A | 8/2000 | Zhang et al. | |

(Continued)

FOREIGN PATENT DOCUMENTS

JP          9-5764          1/1997

(Continued)

OTHER PUBLICATIONS

"In-Plane Switching of Nematic Liquid Crystals", R. Kiefer, et al., Japan Display, 1992, pp. 547-550.

(Continued)

*Primary Examiner*—James A Dudek
(74) *Attorney, Agent, or Firm*—McKenna Long & Aldridge LLP

(57) ABSTRACT

An in-plane switching mode liquid crystal display device includes first and second substrates, a plurality of gate lines and data lines on the first substrate to define a plurality of pixel areas, a driving element in each of the pixel areas of the first substrate, at least one first and second electrodes in each of the pixel areas of the first substrate, a black matrix on the second substrate, the black matrix being made of a black resin material having resistance not greater than $10^8$ Ωcm and a dielectric constant not less than 14, and a liquid crystal layer between the first and second substrates.

12 Claims, 3 Drawing Sheets

U.S. PATENT DOCUMENTS 6,100,956 A * 8/2000 Oh-e et al. .................. 349/141
6,266,166 B1 7/2001 Katsumata et al.
6,900,862 B2 * 5/2005 Do .............................. 349/110

FOREIGN PATENT DOCUMENTS

JP 9-73101 3/1997

OTHER PUBLICATIONS

"Principles and Characteristics of Electro-Optical Behaviour with In-Plane Switching Mode", M. Oh-e, et al., Asia Display, 1995, pp. 577-580.

"Development of Super-TFT-LCDs with In-Plane Switching Mode", M. Ohta, et al., Asia Display, 1995, pp. 707-710.

"LP-A Display Characteristics of In-Plane Switching (IPS) LCDs and a Wide-Viewing-Angle 14.5-in. IPS TFT-LCD", S. Matsumoto, et al., Euro Display, 1996, pp. 445-448.

"An Advanced In-Plane-Switching Mode TFT-LCD", H. Wakemoto, et al., SID Digest, 1997, pp. 929-932.

"High-Transmittance, Wide-Viewing-Angle Nematic Liquid Crystal Display Controlled by Fringe-Field Switching", S.H. Lee, et al., Asia Display, 1998, pp. 371-374.

"Advanced 18.1-inch Diagonal Super-TFT-LCDs with Mega Wide Viewing Angle and Fast Response Speed of 20ms", S. Endoch, et al., IDW, 1999, pp. 187-190.

* cited by examiner

METHOD OF FABRICATING IN-PLANE SWITCHING MODE LIQUID CRYSTAL DISPLAY DEVICE

This is a Continuation of application Ser. No. 10/453,568 filed on Jun. 4, 2003 now U.S. Pat. No. 6,900,862.

The present invention claims the benefit of Korean Application No. 2002/78870 filed in Korea on Dec. 11, 2002, which is hereby incorporated by reference.

BACKGROUND OF THE INVENTION

1. Field of the Invention

The present invention relates to an in-plane switching mode liquid crystal display device, and more particularly, to an in-plane switching mode liquid crystal display device that is capable of preventing distortion of a horizontal electric field applied to a liquid crystal layer.

2. Discussion of the Related Art

Recently, many efforts have been made to study and develop various types of flat display panels, such as liquid crystal display devices (LCDs), plasma display panels (PDPs), field emission display devices (FEDs), and vacuum fluorescent display devices (VFDs). Some of these types of flat display panels, especially LCDs, have been applied in and incorporated into various portable electronic equipment including mobile phones, personal data assistants devices (PDAs), and notebook computers because of their high quality image, lightness, small thickness, compact size and low power consumption.

In general, a liquid crystal display device has various display modes depending on an alignment of liquid crystal molecules deposited therein. Currently, a twisted nematic (TN) mode is commonly employed because of its ease of white-black display, rapid response time and low driving voltage. In a TN mode, when voltage is applied to liquid crystal molecules of the liquid crystal display device, the liquid crystal molecules are aligned at right angles to a substrate of the liquid crystal display device. However, a viewing angle of the liquid crystal display device thus is reduced due to refractive anisotropy of the liquid crystal molecules aligned at right angles to the substrate.

In order to solve the above-mentioned viewing angle problem, various types of liquid crystal display devices having wide viewing angle characteristics, such as in plane switching (IPS) mode liquid crystal display devices, have been developed. For example, in an IPS mode liquid crystal display device, liquid crystal molecules generally are aligned in a plane by including at least a pair of electrodes arranged in parallel to each other in pixel areas and forming a horizontal electric field parallel to a substrate.

FIG. 1 is a plan view of an in-plane switching mode liquid crystal display device according to a related art. In FIG. 1, a liquid crystal display panel 1 includes a plurality of gate lines 3 arranged along one direction at a predetermined interval from each other, a plurality of data lines 4 arranged along a direction perpendicular to the gate lines 3 at a predetermined interval from each other, a plurality of pixel electrodes 7a and 7b formed within pixel areas defined by the gate and data lines 3 and 4 crossing each other, a plurality of common electrodes 5a-5c formed within the pixel areas, and a plurality of thin film transistors 10 formed within the pixel areas and switched by signals of the gate lines 3 to transfer signals of the data lines 4 to the pixel electrodes 7a and 7b. The common electrodes 5a-5c and the pixel electrodes 7a and 7b are generally formed of nontransparent metal.

In addition, each of the thin film transistors 10 includes a gate electrode 11 in which a scan signal is applied from a corresponding one of the gate lines 3, a semiconductor layer 12 formed on the gate electrode 11, and source and drain electrodes 13 and 14 formed on the semiconductor layer 12 and receiving a picture signal through a corresponding one of the data lines 4. In particular, when the scan signal is applied to the gate electrode 11, the semiconductor layer 12 becomes a channel layer. In addition, the first, second and third common electrodes 5a-5c and the first and second pixel electrodes 7a and 7b are arranged parallel to the data lines 4. Further, at the middle of each of the pixel areas, a common line 16 connects to the common electrodes 5a-5c, and a pixel electrode line 18 connects to the pixel electrodes 7a and 7b, such that the pixel electrode line 18 overlaps with the common line 16.

Further, the IPS mode liquid crystal display device includes a liquid crystal layer, such that the liquid crystal molecules deposited therein are aligned parallel to the common electrodes 5a-5c and the pixel electrodes 7a and 7b. Also, the IPS mode liquid crystal display device includes a black matrix (not shown) for preventing light leakage, and the black matrix is made of nonconductive material having nonconductive characteristics. Thus, when the thin film transistor 10 is operated to apply signals to the pixel electrodes 7a and 7b, a horizontal electric field between the common electrodes 5a-5c and the pixel electrodes 7a and 7b is generated parallel to the liquid crystal display panel 1. Accordingly, the liquid crystal molecules become perpendicularly aligned to the common electrodes 5a-5c and the pixel electrodes 7a and 7b due to the horizontal electric field, thereby preventing gray level inversion caused by the refractive anisotropy of the liquid crystal molecules aligned at right angles to the liquid crystal display panel 1.

However, when the horizontal electric field is generated between the common electrodes 5a-5c and the pixel electrodes 7a and 7b, a second electric field also could be generated between the pixel electrodes 7a and 7b, and the data lines 4, such that this second electric field distorts the horizontal electric field. In this situation, the liquid crystal molecules would not be aligned perfectly parallel to the liquid crystal display panel 1, and cross talk in the vertical direction would be generated. Therefore, the first common electrode 5a is arranged between the first pixel electrode 7a and a corresponding one of data lines 4. Also, the third common electrode 5c is arranged between the second pixel electrode 7b and another corresponding one of the data lines 4, to thereby prevent an electric field from being generated between the pixel electrodes 7a and 7b and the data lines 4. In particular, to effectively prevent an electric field from being formed between the pixel electrodes 7a and 7b and the data lines 4, the first and third common electrodes 5a and 5c have to be arranged near to the corresponding data lines 4. Thus, the total number of the common electrodes 5a-5c is greater than the total number of the pixel electrodes 7a and 7b by one. Accordingly, by arranging one more common electrode in each of the pixel areas, a region for blocking light is increased. However, such arrangement undesirably lowers an aperture ratio of the IPS mode liquid crystal display device.

Alternatively, a width of the first and third common electrodes 5a and 5c has to be increased to effectively prevent an electric field being formed between the pixel electrodes 7a and 7b and the data lines 4. Similarly, such increase of a width of the common electrodes 5a and 5b also greatly lowers an aperture ratio of the IPS mode liquid crystal display device.

SUMMARY OF THE INVENTION

Accordingly, the present invention is directed to an in-plane switching mode liquid crystal display device that substantially obviates one or more problems due to limitations and disadvantages of the related art.

An object of the present invention is to provide an in-plane switching mode liquid crystal display device that is capable of preventing cross talk in the vertical direction by preventing distortion of a horizontal electric field applied to a liquid crystal layer by forming a black matrix of a dielectric material.

Another object of the present invention is to provide an in-plane switching mode liquid crystal display device that is capable of removing a common electrode arranged near a data line and is capable of preventing cross talk in the vertical direction.

Another object of the present invention is to provide an in-plane switching mode liquid crystal display device that is capable of improving an aperture ratio by decreasing a width of a common electrode arranged near to a data line and is capable of preventing cross talk in the vertical direction.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, the in-plane switching mode liquid crystal display device includes first and second substrates, a plurality of gate lines and data lines on the first substrate to define a plurality of pixel areas, a driving element in each of the pixel areas of the first substrate, at least one first and second electrodes in each of the pixel areas of the first substrate, a black matrix on the second substrate, the black matrix being made of a black resin material having resistance not greater than $10^8$ $\Omega$cm and a dielectric constant not less than 14, and a liquid crystal layer between the first and second substrates.

In another aspect, the in-plane switching mode liquid crystal display device includes first and second substrates, a plurality of gate lines and data lines on the first substrate to define a plurality of pixel areas, a driving element in each of the pixel areas of the first substrate, at least a pair of electrodes in each of the pixel areas of the first substrate, a black matrix on the second substrate, the black matrix being made of a black resin material having low resistance and high dielectric constant, and a liquid crystal layer between the first and second substrates.

In another aspect, the in-plane switching mode liquid crystal display device includes first and second substrates, a plurality of gate lines and data lines on the first substrate to define a plurality of pixel areas, a driving element in each of the pixel areas of the first substrate, at least a pair of electrodes in each of the pixel areas of the first substrate, a dielectric black matrix on the second substrate, an electric field being generated between the dielectric black matrix and the data lines that does not distort a horizontal electric field between the pair of electrodes, and a liquid crystal layer between the first and second substrates.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
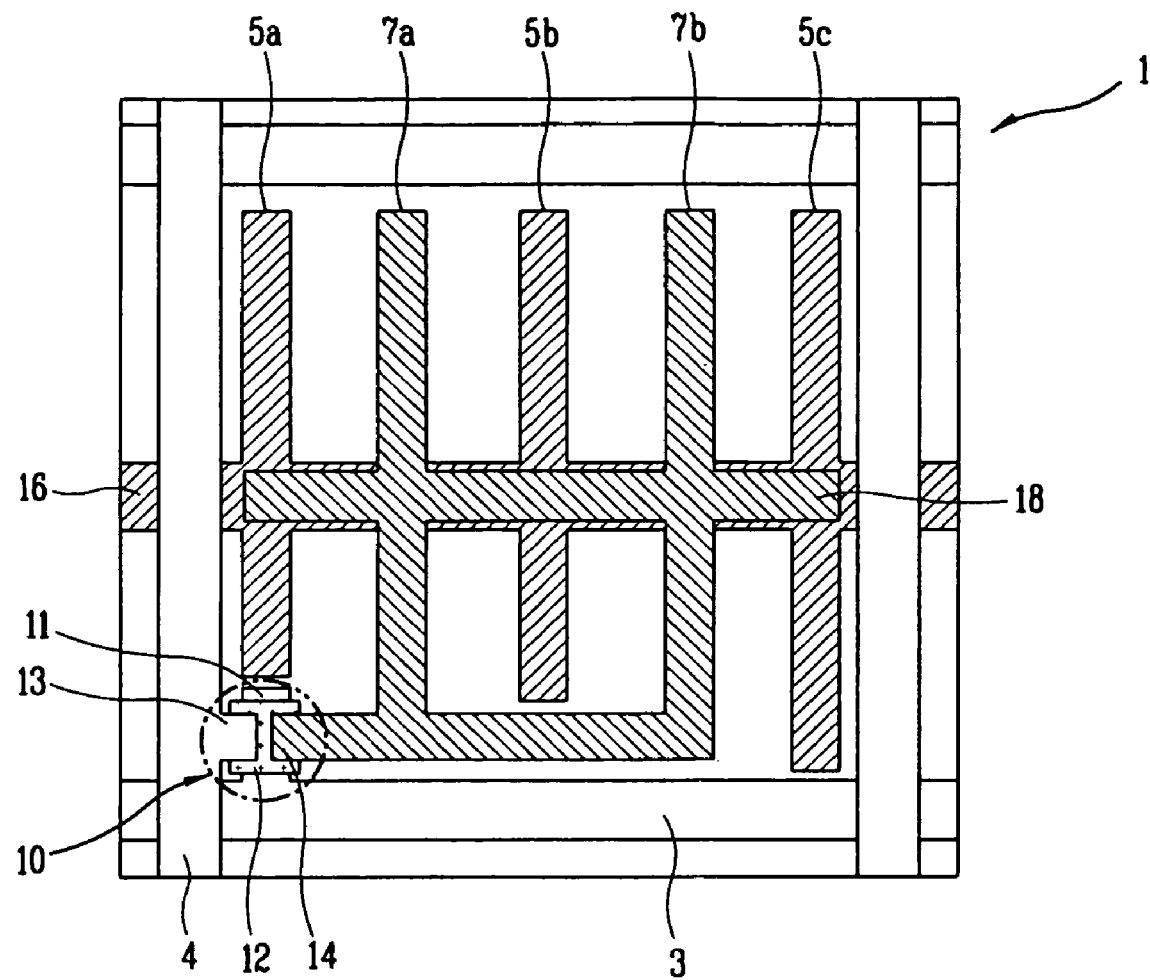
FIG. 1 is a plan view of an in-plane switching mode liquid crystal display device according to a related art.
Figure 2A:
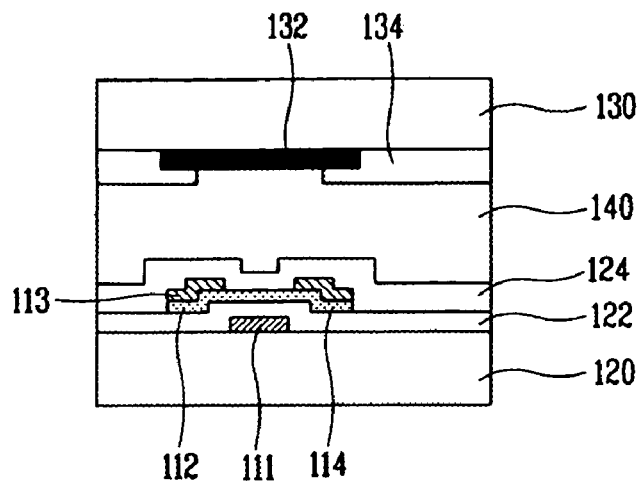
FIG. 2A is a sectional view of a thin film transistor of an exemplary in-plane switching mode liquid crystal display device according to the present invention.
Figure 2B:
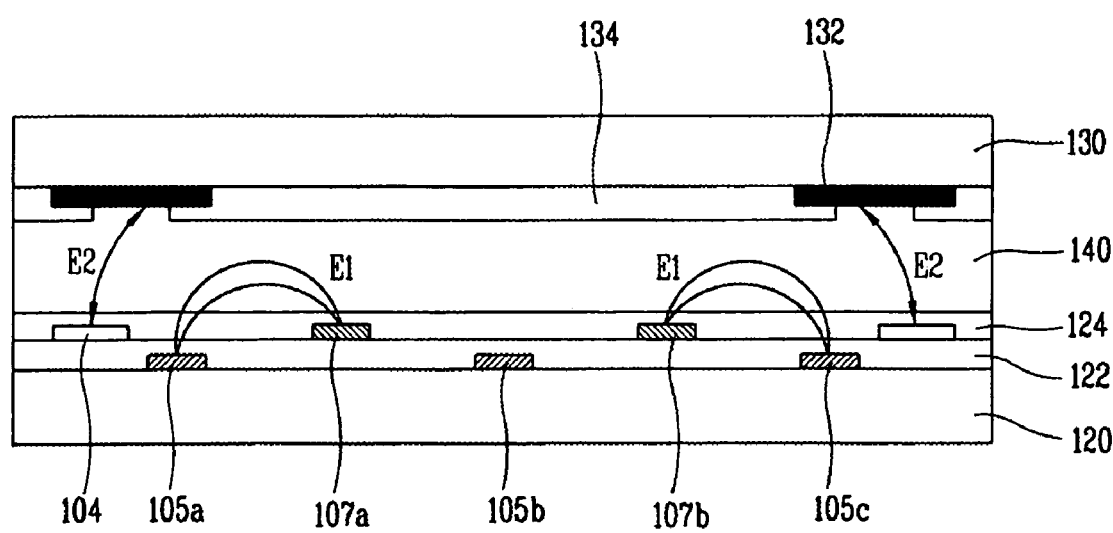
FIG. 2B is a sectional view of a pixel of the exemplary in-plane switching mode liquid crystal display device according to the present invention.

FIG. 2A is a sectional view of a thin film transistor of an exemplary in-plane switching mode liquid crystal display device according to the present invention, and FIG. 2B is a sectional view of a pixel of the exemplary in-plane switching mode liquid crystal display device according to the present invention. In FIG. 2A, an exemplary IPS mode liquid crystal display device may include a first substrate 120 and a thin film transistor formed on the first substrate 120. The thin film transistor may include a gate electrode 111, a semiconductor layer 112, and source and drain electrodes 113 and 114. The gate electrode 111 may be formed on the first substrate 120, and a gate insulating layer 122 may be laminated onto an entire surface of the first substrate 120 covering the gate electrode 111. In addition, the semiconductor layer 112 may be formed onto the gate insulating layer 122 above the gate electrode 111, and the source electrode 113 and the drain electrode 114 may be formed thereon. A passivation layer 124 also may be formed on the entire surface of the first substrate 120 covering the source and drain electrodes 113 and 114.

The IPS mode liquid crystal display device also may include a second substrate 130 bonded to the first substrate 120 with a predetermined space therebetween, such that a liquid crystal layer 140 may be interposed between the first and second substrates 120 and 130. Also, a black matrix 132 and a color filter layer 134 may be formed on the second substrate 130.

In particular, the black matrix 132 may be formed between a thin film transistor forming region and pixels, i.e., the gate and data lines regions, to prevent light leakage to a region in which liquid crystal molecules are not operated, i.e., a non-display region in which images are not displayed. In addition, the black matrix 132 may be formed of a black resin material, which has low resistance and high dielectric characteristics.

For example, the black matrix 132 may be formed by a photolithography process by laminating a black resin including one of carbon pigment and red/green/blue mixture pigments onto the second substrate 130, forming a pattern mask, irradiating light such as ultraviolet light and activating a developer to form a desired pattern. Thus, the black matrix 132 may be a dielectric having characteristics opposite to a nonconductive material. Accordingly, an electric field may be formed between the black matrix 132 and another conductive/dielectric material. Preferably, the black matrix 132 may have a resistance not greater than about $10^8$ Ω·cm and a dielectric constant not less than about 14 in a measure frequency of 1 kHz. Moreover, the black matrix 132 may be formed among R, G, B pixels (or sub-pixels). Accordingly, the black matrix 132 may be formed onto the second substrate 130 as a matrix shape, and the color filter layer 134 may be formed by laminating R, G, B color resist between the black matrix 132.

Further, the color filter layer 134 may include red (R), green (G) and blue (B) color filter layers for producing colored light. Moreover, an overcoat layer (not shown) may be formed on the color filter layer 134 to improve flatness of the second substrate 130 and to protect the color filter layer 134.

In FIG. 2B, the IPS mode liquid crystal display device may include a plurality of gate lines (not shown) formed on the first substrate 120, a plurality of common electrodes 105a-105c formed on the first substrate 120, and a plurality of pixel electrodes 107a and 107b formed on the gate insulating layer 122. The pixel electrodes 107a and 107b may be parallel to the common electrodes 105a-105c. Also, the common electrodes 105a-105c and the pixel electrodes 107a and 107b may be made of a nontransparent metal having small resistivity or a transparent material such as indium tin oxide (ITO) or indium zinc oxide (IZO).

Further, a plurality of data lines 104 may be formed on the gate insulating layer 122. Thus, when the thin film transistor is switched by signals of the gate lines (not shown) to transfer signals of the data lines 104 to the pixel electrodes 107a and 107b, a first horizontal electric field E1 may be generated between the common electrodes 105a-105c and the pixel electrodes 107a and 107b. Accordingly, liquid crystal molecules in the liquid crystal layer 140, which may be initially arranged according to an alignment direction of an alignment layer (not shown), may then be rotated according to the first horizontal electric field E1, to thereby display images on the liquid crystal display device.

In addition, because the black matrix 132 may be formed of a black resin material having dielectric characteristics, second electric fields E2 may be generated between the data lines 104 and the black matrix 132. In particular, an intensity of the electric fields E2 between the data lines 104 and the black matrix 132 may be very small in comparison with an intensity of the first horizontal electric field E1 (E1>>E2). However, because the second electric fields E2 may have a generally vertical direction, the second electric fields E2 do not affect or distort the first horizontal electric field E1. The second electric fields E2 may prevent a third electric field from being generated between the data lines 104 and the pixel electrodes 107a and 107b, thereby preventing a distortion of the first horizontal electric field E1 and preventing cross talk in the vertical direction. Further, a width of the common electrodes 105a and 105c arranged close to the data lines 104 may be reduced, thereby improving an aperture ratio of the IPS mode liquid crystal display device.

Additionally, the second electric fields E2 may be coupled with an arrangement of the common electrodes 105a and 105c being close to the data lines 104 to prevent a distortion of the first horizontal electric field E1. When the arrangement of the common electrodes 105a and 105c being close to the data lines 104 is coupled with the second electric fields E2, the intensity of the second electric fields E2 may be lower than when the second electric fields E2 are not coupled with the arrangement of the common electrodes 105a and 105c being close to the data lines 104.

Figure 3A:
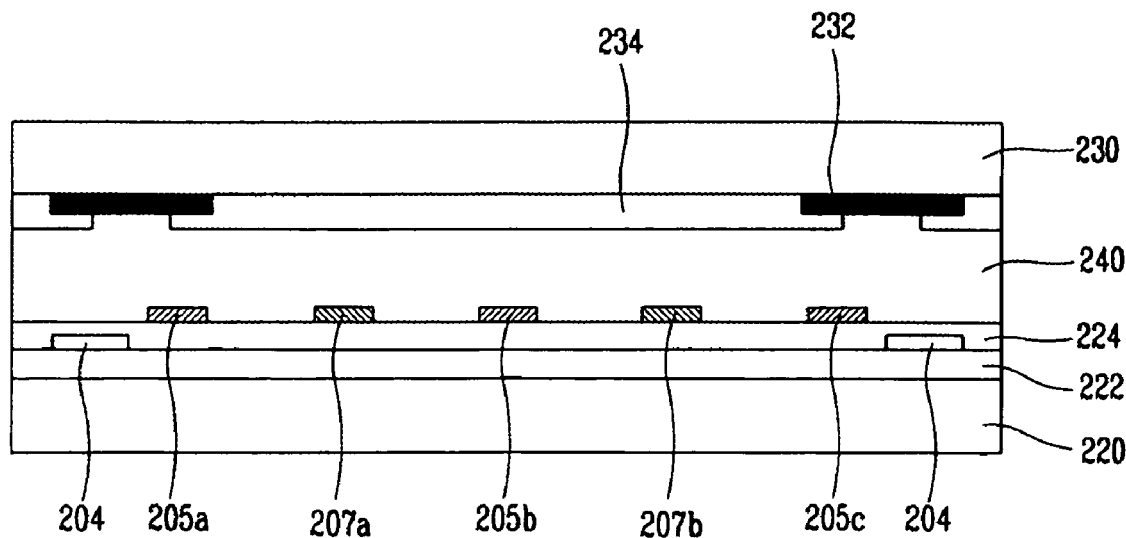
FIG. 3A is a sectional view of another exemplary in-plane switching mode liquid crystal display device according to the present invention.

FIG. 3A is a sectional view of another exemplary in-plane switching mode liquid crystal display device according to the present invention. In FIG. 3A, another exemplary IPS mode liquid crystal display device may include a first substrate 220, a plurality of common electrodes 205a-205c formed on the first substrate 220, and a plurality of pixel electrodes 207a and 207b formed on the first substrate 220. A thin film transistor (not shown), a plurality of gate lines (not shown), and a plurality of data lines 204 also may be formed on the first substrate 220. In particular, a gate insulating layer 222 may be formed on an entire surface of the first substrate 220, and the data lines 204 may be formed on the gate insulating layer 222. Also, a passivation layer 224 may be formed on the entire surface of the first substrate 220 covering the data lines 204, and the common electrode 205a-205c and the pixel electrodes 207a and 207b may be formed on the passivation layer 224. In addition, the common electrodes 205a and 205c may be formed close to a corresponding one of the data lines 204.

The IPS mode liquid crystal display device also may include a second substrate 230 bonded to the first substrate 220 with a predetermined space therebetween, such that a liquid crystal layer 240 may be interposed between the first and second substrates 220 and 230. Also, a black matrix 232 and a color filter 234 may be formed on the second substrate 230. In particular, the black matrix 232 may be formed of a black resin material, which has low resistance and high dielectric characteristics. Accordingly, an electric field may be formed between the black matrix 232 and another conductive/dielectric material. Thus, when the thin film transistor (not shown) is switched by signals of the gate lines (not shown) to transfer signals of the data lines 204 to the pixel electrodes 207a and 207b, a first horizontal electric field may be generated between the common electrodes 205a-205c and the pixel electrodes 207a and 207b. Also, minute electric fields may be generated between the data lines 240 and the black matrix 232, such that an intensity of the minute electric fields is much smaller than an intensity of the first horizontal electric field between the common electrodes 205a-205c and the pixel electrodes 207a and 207b. Accordingly, the minute electric fields between the data lines 240 and the black matrix 232 do not distort the first horizontal electric field. Yet, the minute electric fields between the data lines 240 and the black matrix 232 may prevent an electric field from being generated between the data lines 204 and the pixel electrodes 207a and 207b, thereby preventing a distortion of the first horizontal electric field between the common electrodes 205a-205c and the pixel electrodes 207a and 207b and preventing cross talk in the vertical direction. Further, a width of the common electrodes 205a and 205c arranged close to the data lines 204 may be reduced, thereby improving an aperture ratio of the IPS mode liquid crystal display device.

Moreover, the IPS mode liquid crystal display device also may be referred to as a 4 block IPS mode liquid crystal display device because the arrangement of the three common electrodes 205a-205c and the two pixel electrodes 207a and 207b forms four light transmittance regions. Furthermore, the arrangement of the common electrodes 205a-205c and the pixel electrode 207a and 207b may be similarly applied to form various block-types IPS mode liquid crystal display devices. For example, a 2 block IPS mode liquid crystal display device may be formed by arranging one pixel electrode between two common electrodes, or a 6 block IPS mode liquid crystal display device may be formed by arranging three pixel electrodes interposed between four common electrodes.

Figure 3B:
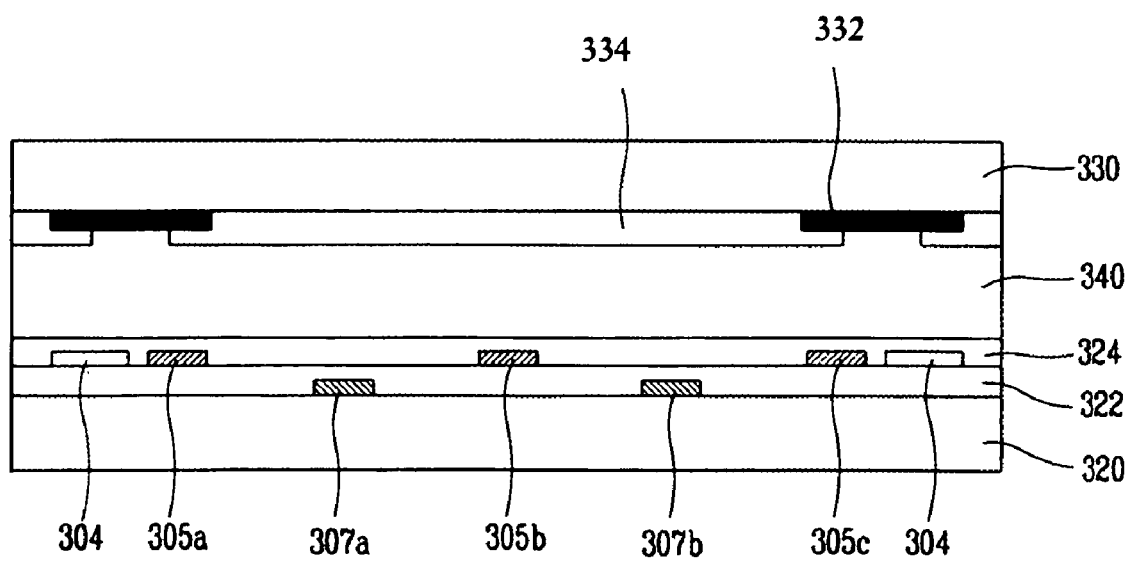
FIG. 3B is a sectional view of another exemplary in-plane switching mode liquid crystal display device according to the present invention.

FIG. 3B is a sectional view of another exemplary in-plane switching mode liquid crystal display device according to the present invention. In FIG. 3B, another exemplary IPS mode liquid crystal display device may include a first substrate 320, a plurality of common electrode 305a-305c formed on the first substrate 320, and a plurality of pixel electrodes 307a and 307b formed on the first substrate 320. A thin film transistor (not shown), a plurality of gate lines (not shown), a plurality of data lines 304 also may be formed on the first substrate 320. In particular, the pixel electrodes 307a and 307b may be formed on the first substrate 320, and a gate insulating layer 322 may be formed on an entire surface of the first substrate 320 covering the pixel electrodes 307a and 307b. Also, the data lines 304 and the common electrodes 305a-305c may be formed on the gate insulating layer 322. A passivation layer 324 may be formed on the entire surface of the first substrate 320 covering the data lines 304 and the common electrodes 305a-305c. In addition, the common electrodes 305a and 305c may be formed close to a corresponding one of the data lines 304.

The IPS mode liquid crystal display device also may include a second substrate 330 bonded to the first substrate 320 with a predetermined space therebetween, such that a liquid crystal layer 340 may be interposed between the first and second substrates 320 and 330. Also, a black matrix 332 and a color filter 334 may be formed on the second substrate 330. In particular, the black matrix 332 may be formed of a black resin material, which has low resistance and high dielectric characteristics. Accordingly, an electric field may be formed between the black matrix 332 and another conductive/dielectric material. Thus, when the thin film transistor (not shown) is switched by signals of the gate lines (not shown) to transfer signals of the data lines 304 to the pixel electrodes 307a and 307b, a first horizontal electric field may be generated between the common electrodes 305a-305c and the pixel electrodes 307a and 307b. Also, minute electric fields may be generated between the data lines 340 and the black matrix 332, such that an intensity of the minute electric fields is much smaller than an intensity of the first horizontal electric field between the common electrodes 305a-305c and the pixel electrodes 307a and 307b. Accordingly, the minute electric fields between the data lines 340 and the black matrix 332 do not distort the first horizontal electric field. The minute electric fields between the data lines 340 and the black matrix 332 may prevent an electric field from being generated between the data lines 304 and the pixel electrodes 307a and 307b, thereby preventing a distortion of the first horizontal electric field between the common electrodes 305a-305c and the pixel electrodes 307a and 307b and preventing cross talk in the vertical direction. Further, a width of the common electrodes 305a and 305c arranged close to the data lines 304 may be reduced, thereby improving an aperture ratio of the IPS mode liquid crystal display device.

It will be apparent to those skilled in the art that various modifications and variations can be made in the in-plane switching mode liquid crystal display device of the present invention. Thus, it is intended that the present invention covers the modifications and variations of this invention provided they come within the scope of the appended claims and their equivalents.

What is claimed is:

1. A method of fabricating an in-plane switching mode liquid crystal display device, comprising:

forming a plurality of gate lines and data lines on a first substrate to define a plurality of pixel areas;

forming a driving element in each of the pixel areas of the first substrate;

forming at least one first and second electrodes in each of the pixel areas of the first substrate;

forming a black matrix on a second substrate, the black matrix including first portions parallel to the gate line and second portion parallel to the data line, a resistance and a dielectric constant of the first portions being same as that of the second portions and forming a liquid crystal layer between the first and second substrates, wherein the black matrix is made of a black resin material having resistance not greater than $10^8$ Ωcm and a dielectric constant not less than 14 in a measure frequency of 1 kHz.

2. The method of claim 1, wherein the forming at least one first and second electrodes includes forming the first electrode near a corresponding one of the data lines.

3. The method of claim 1, wherein the forming a driving element includes forming a thin film transistor.

4. The method of claim 3, wherein the forming a thin film transistor includes:

forming a gate electrode on the first substrate;

forming an insulating layer on the first substrate covering the gate electrode;

forming a semiconductor layer on the insulating layer;

forming a source electrode and a drain electrode on the semiconductor layer; and forming a passivation layer on the first substrate covering the source and drain electrodes.

5. The method of claim 4, wherein the forming the first and second electrodes includes forming the first electrode on the first substrate and the second electrode on the gate insulating layer.

6. The method of claim 5, wherein the forming the first and second electrodes includes forming the first electrode near the data line.

7. The method of claim 4, wherein the forming the first and second electrodes includes forming the first electrode on the gate insulating layer and the second electrode on the first substrate.

8. The method of claim 7, wherein the forming the first and second electrodes includes forming the first electrode near the data line.

9. The method of claim 4, wherein the forming the first and second electrodes includes forming the first and second electrodes on the passivation layer.

10. The method of claim 4, wherein the forming the first and second electrodes includes forming the first and second electrodes on the gate insulating layer.

11. The method of claim 4, wherein the forming the first and second electrodes includes forming the first and second electrodes on the first substrate.

12. The method of claim 1, further comprising forming a color filter layer on the second substrate.

* * * * *